US011893134B1

(12) United States Patent
Zhou et al.

(10) Patent No.: US 11,893,134 B1
(45) Date of Patent: Feb. 6, 2024

(54) ENHANCED CLEAN-ROOM BASED MACHINE LEARNING

(71) Applicant: Amazon Technologies, Inc., Seattle, WA (US)

(72) Inventors: Chuandong Zhou, Westminster, CO (US); Pramod Varma, Boulder, CO (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/067,312

(22) Filed: Dec. 16, 2022

(51) Int. Cl.
*G06F 21/62* (2013.01)
*G06Q 30/0242* (2023.01)
*G06Q 30/0251* (2023.01)

(52) U.S. Cl.
CPC ..... *G06F 21/6245* (2013.01); *G06Q 30/0246* (2013.01); *G06Q 30/0253* (2013.01)

(58) Field of Classification Search
CPC ............ G06Q 30/0253; G06Q 30/0246; G06F 21/6245
See application file for complete search history.

(56) References Cited

U.S. PATENT DOCUMENTS

| | | | |
|---|---|---|---|
| 10,580,035 B2 * | 3/2020 | Mehanian | G06Q 30/0269 |
| 11,157,965 B1 * | 10/2021 | Chud | H04N 21/6582 |
| 11,417,085 B2 * | 8/2022 | Saraee | G06F 16/953 |
| 2022/0059190 A1 * | 2/2022 | Ahmed | G16B 50/20 |
| 2022/0300999 A1 * | 9/2022 | Ortiz | G06Q 30/0224 |

OTHER PUBLICATIONS

Zhou et al., 'Clean Room for Advertising Optimization', Phoenix '22: ACM International Conference on Web Search and Data Mining, Feb. 21-25, 2022, 2 pages, Phoenix, AZ.

* cited by examiner

*Primary Examiner* — Michael I Ezewoko
(74) *Attorney, Agent, or Firm* — Eversheds Sutherland (US) LLP (57) ABSTRACT

Devices, systems, and methods are provided for encapsulating machine learning in a clean room to generate a goal-based output. A method may include identifying, by a device operating within a clean room, an agreement between multiple parties to share data for use in machine learning to generate a goal-based output; retrieving the data; selecting the machine learning model based on a goal indicated by the agreement; generating, using the data as inputs to the selected machine learning model, a first set of probabilities indicative that a respective user may perform an action; generating, using the selected machine learning model and the first set of probabilities, a second set of probabilities indicative that a respective user may perform the action; generating the goal-based output based on the second set of probabilities; and sending the goal-based output from the clean room to a destination location.

18 Claims, 4 Drawing Sheets

ENHANCED CLEAN-ROOM BASED MACHINE LEARNING

BACKGROUND

Adversarial parties may not share data with one another, often for privacy compliance reasons. The inability of parties to share data may undermine processes, including machine learning. There is a need for privacy-compliant data sharing for machine learning processes.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced clean-room based machine learning.

Data privacy laws have impacted parties in a variety of industries, including content distribution and advertising. For example, in computational advertising, adverse parties may not share certain data with one another, and the unshared data may be useful to making decisions regarding targeted advertising. Other industries face similar restrictions that undermine the ability to make assessments about actual and prospective customers, viewers, and the like.

A privacy-compliant product category called clean rooms has emerged as a replacement to direct sharing data curator systems. Clean rooms allow for information retrieval operations on event level data in a privacy-safe environment without relinquishing full control of the data.

In addition, machine learning models may be used to optimize decisions regarding advertising campaign decisions, generate target audiences based on estimates of viewers, and make decisions about which content to distribute to which people and how. However, the ability of machine learning models to learn and optimize may be undermined by an inability to acquire data due to privacy restrictions.

There is therefore a need for clean-room based machine learning.

In one or more embodiments, in the context of advertising and content distribution, a clean room may provide a privacy safe environment for advertisers to generate insight and optimization actions for their online advertising campaigns. A clean room may include data entities and tools entities. For advertising, datasets available may include advertising impressions, clicks, ads-attributed conversion events, view events, and audience segment membership. The tools may support various computational workload on clean room datasets, such as SQL engine, and machine learning capability. The clean room may be privacy-safe. Although it may contain event-level data at user granularity within its execution environment, it may govern egress data and results for privacy safety. No participating party may access any individual's user privacy data in the clean room, and the clean room may impose constraints for its outputs for privacy compliance.

In one or more embodiments, the clean room may be used for automated advertising and other processes using machine learning. Adverse parties may have multiple data sources in the clean room, including data from publishers, measurement services, and their own data. The clean room may enforce privacy compliance by denying event-level data from parties using the clean room, while also safeguarding the clean room data from privacy attacks.

In a typical machine learning lifecycle, a party may need full access and control to certain data (e.g., event-level data) and algorithms to optimize an output (e.g., an advertising campaign). However, privacy constraints may prevent a party from accessing another party's event-level data. In one or more embodiments, the clean room may enable a party to perform machine learning techniques on such data from an adverse party (e.g., based on an agreement between the parties). Each party using the clean room may have its own data, privacy policies, and regulation. Machine learning training, machine learning registry, and machine learning output may occur within the clean room, with restrictions on where the outputs may be sent outside of the clean room.

In one or more embodiments, in the advertising context, one data source for the machine learning in the clean room may include ad server operation data for impressions and clicks, and spontaneous user interactions on a retail website or at a physical retail location may be another data source. The clean room may include data from independent ad serving data providers, such as a data management platform (DMP). Parties may ingress their proprietary data such as customer relation management (CRM) into the clean room.

In one or more embodiments, to enforce privacy, when running machine learning algorithms, an advertiser may only receive differential privacy (DP) synthetic generated data from local data exploration and training. The clean room may encapsulate machine learning training models and inference results with event-level data, preventing parties from accessing their event-level data. Inference results, such as target audiences generated by machine learning, may integrate with an advertising system for bidding optimization, for example, in the advertising context.

In one or more embodiments, the clean-room based machine learning in the advertising context may be use to optimize spend via machine learning-enabled audience targeting. A machine learning model in the clean room may use multi-channel data to identify consumers with a high likelihood (e.g., greater than a threshold likelihood) to purchase a product based on exposure to marketing outreach. For example, audiences with a high propensity to purchase following a marketing engagement, consumers new to a product category, and the like. Such target audience estimation using machine learning may not be possible, or may not be very accurate, without data that would otherwise be unavailable due to privacy concerns (e.g., data from adversarial parties). In this manner, secure use of the clean room to share data with machine learning models may allow for such learning and outputs to occur in a privacy-compliant manner to produce more accurate results.

In one or more embodiments, to generate an audience, a hybrid recommendation engine may be used with user behavior data. Hypotheses may be generated to create lists of top audiences with propensities to purchase. This type of engine may use information regarding historical purchases as well as user behavioral features, made available in the clean room. The machine learning algorithm may use, for example, a deep neural networks architecture (e.g., neural collaborative filtering) or another architecture, encapsulated by the clean room.

In one or more embodiments, a first machine learning process in the clean room may include using training data to train machine learning models. A second machine learning process in the clean room may include using adversarial party data to generate a machine learning output (e.g., a target audience in the advertising context). The machine learning may include multiple control layers, such as data isolation in the clean room, machine learning model artifacts, and metadata filtering. Parties using the clean room may agree on a destination location for machine learning outputs (e.g., to control the egress), and may agree to provide machine learning models to be used within the clean room. By controlling the egress, the adversarial parties using the clean room may not actually see the machine learning outputs, such as a target audience.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
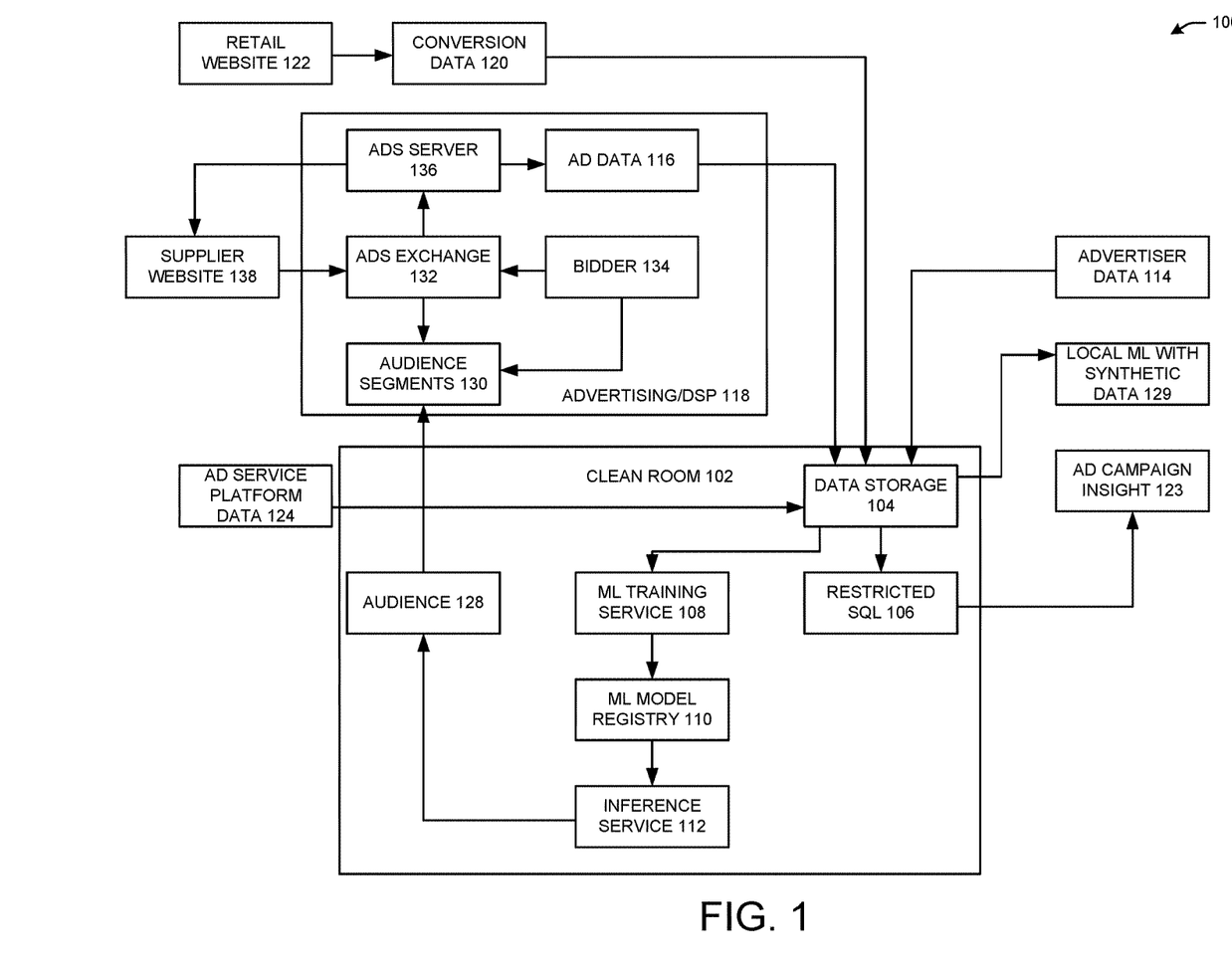
FIG. 1 illustrates an example system for clean-room based machine learning for generating target audiences, in accordance with one or more example embodiments of the present disclosure.

FIG. 1 illustrates an example system 100 for clean-room based machine learning for generating target audiences, in accordance with one or more example embodiments of the present disclosure.

Referring to FIG. 1, the system 100 may include a clean room 102 that may encapsulate machine learning in a privacy-safe environment for multiple agreeing parties. The clean room 102 may include data storage 104 (e.g., a private data lake or other storage) for ingress data that may be provided by a variety of sources. The clean room 102 also may include a restricted SQL 106 (e.g., that may run in parallel to machine learning), a machine learning (ML) training service 108 for training ML models, a ML model registry 110 for storing trained ML models, and an inference service 112 for using ML models in the ML model registry 112 to generate outputs. The data storage 104 may receive input data such as advertiser data 114, ad data 116 (e.g., from an advertising/DSP—demand side service platform—service 118), and conversion data 120 (e.g., from a retail website 122 or physical retailer location). The input data may be retrieved and used by the restricted SQL 106 to execute SQL queries with k-anonymity and/or differential privacy (e.g., resulting in generation of ad campaign insight 123.

Still referring to FIG. 1, ad service platform data 124 also may be provided to the data storage 124 and used by the restricted SQL 106. The ML training service 108 may use data from the data storage 104 to train ML models to be used by the inference service 112, which may select ML models from the ML model registry 110 and use them to generate an audience 128 as an ML output. The audience 128 may not be seen by the parties that agree to provide their data to the clean room 102 (e.g., advertisers who provide the advertiser data 114 and/or the ad service platform data 124). The egress of the audience 128 may be controlled via an agreement set with the clean room 102 so that the clean room 102 only provides the audience 128 to an agreed to endpoint (e.g., the advertising/DSP service 118). For example, the audience 128 may be provided to audience segments 130 of the advertising/DSP service 118. When running ML models, a party using the clean room 102 may receive local ML with synthetic data 129 (e.g., DP synthetic generated data for local data exploration and training). An ads exchange 132 and bidder 134 of the advertising/DSP service 118 may retrieve user information from the audience segments 130 to complete the bidding process to optimize cost per impressions. An ads server 136 of the advertising/DSP service 118 may provide operation data for impressions and clicks (e.g., the ad data 116). The ads server 136 may provide operation data to a supplier website 138 external to the advertising/DSP service 118, which may provide data to the ads exchange 132.

In one or more embodiments, the ML training service 108 may retrieve user identifiers, product identifiers for purchased products, timestamp information, product ratings, and the like from the data storage 104, related to purchase data. User data and user metadata also may be input to the ML training service 108. For example, the purchase data and the user data may be stored separately in the data storage 104 and provided to the ML training service 108. The purchase data may include multiple brands and negative samples (e.g., randomly generated) for products that are not purchased so that the ML training service 108 may train ML models on which products are likely to be purchased. The ML training service 108 may use user metadata, user identifiers, and product identifiers as inputs to a ML model to learn a probability of a match (e.g., the probability that a user will purchase a product). The ML model may use a fully connected or non-fully connected deep neural network, for example, including a hybrid recommender engine that may combine historical purchases with user features to estimate the probabilities. The inference service 112 may receive user data, including indications of which users have not yet purchased a product, to estimate probabilities of users to purchase a product. The users having the highest probabilities of purchase may be selected for the audience 128, for example.

Figure 2:
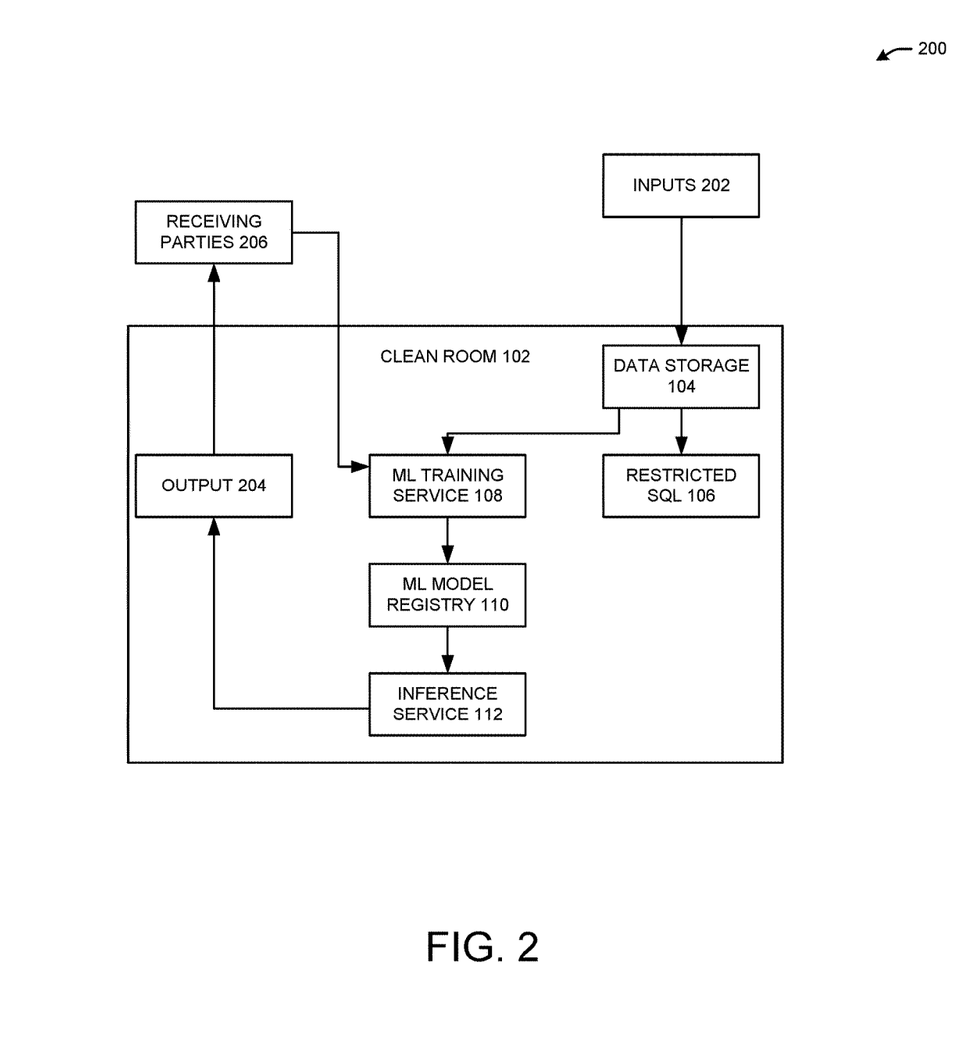
FIG. 2 illustrates an example system for clean-room based machine learning, in accordance with one or more example embodiments of the present disclosure.

FIG. 2 illustrates an example system 200 for clean-room based machine learning, in accordance with one or more example embodiments of the present disclosure.

Referring to FIG. 2, the system 200 may represent the system 100 of FIG. 1 more generally (e.g., a context in which the ML is not necessarily tied to an advertising context). In this manner, the clean room 102 of FIG. 1 is shown with the data storage 104, the restricted SQL 106, he ML training service 108, the ML model registry 110, and the inference service 112. Inputs 202 to the clean room may be provided by multiple parties who may not access the inputs 202 within the clean room 102. The output 204 of the ML encapsulated by the clean room 102 may be the audience 128 of FIG. 1 or something else, depending on the ML model used in the clean room 102. For example, the ML training service 108 may not be limited to training ML models to generate target audiences, but may train ML models for other purposes, such as content recommendations, audience inferences (e.g., audience demographics, preferences, etc.), and the like. In the example of content recommendations, the ML training service 108 may use user information and content information (e.g., the inputs 202), including negative samples of content not selected/viewed to train ML models to estimate a probability that a user will view/interact with presented content, or a probability that presented content will be viewed by a given audience. The output 204 may be provided to receiving parties 206 who may be specified as limited egress destination locations of the output 204 (e.g., as agreed to by the parties using the clean room 102). The receiving parties 206 may provide feedback (e.g., indicative of performance of the output 204, such as ad campaign performance when using a generated target audience) with which to retrain and/or update the ML model (e.g., by adjusting criteria such as rewards and penalties to apply to the ML models to result in different output 204).

In one or more embodiments, a party who provides the inputs 202 may be a different party than a party who receives the output 204. In this manner, privacy may be enhanced by protecting data from the inputs 202 of one party from being viewed by the other party.

In one or more embodiments, referring to FIGS. 1 and 2, the ML model selected from the ML model registry 110 may be selected based on a goal of the output 204. For example, if he goal is an advertising goal such as to generate a target audience (e.g., the audience 128), then the ML model selected may be a model trained by the ML training service 108 to generate the output that is the goal of the parties that use the clean room 102. In this manner, the parties that use the clean room 102 may provide configuration data to the clean room 102, such as which data are to be provided by which parties, egress/output limitations for the generated ML outputs, the ML goals, and the like. Users of the clean room 102 also may provide the ML models to the ML registry 110, either already trained or to be trained by the ML training service 108. The ML encapsulated by the clean room 102 may include reinforced learning in which positive values are assigned to desired outcomes and negative values are assigned to undesired outcomes so that the output 204 is an optimized output from multiple iterations of machine learning. The ML training service 108 may receive, from the parties using clean room 102, specified goals and defined rewards and penalties to apply to the ML models. The output 204 may be updated continuously as the ML model is adjusted and retrained (e.g., based on performance metrics of the output 204).

Figure 3:
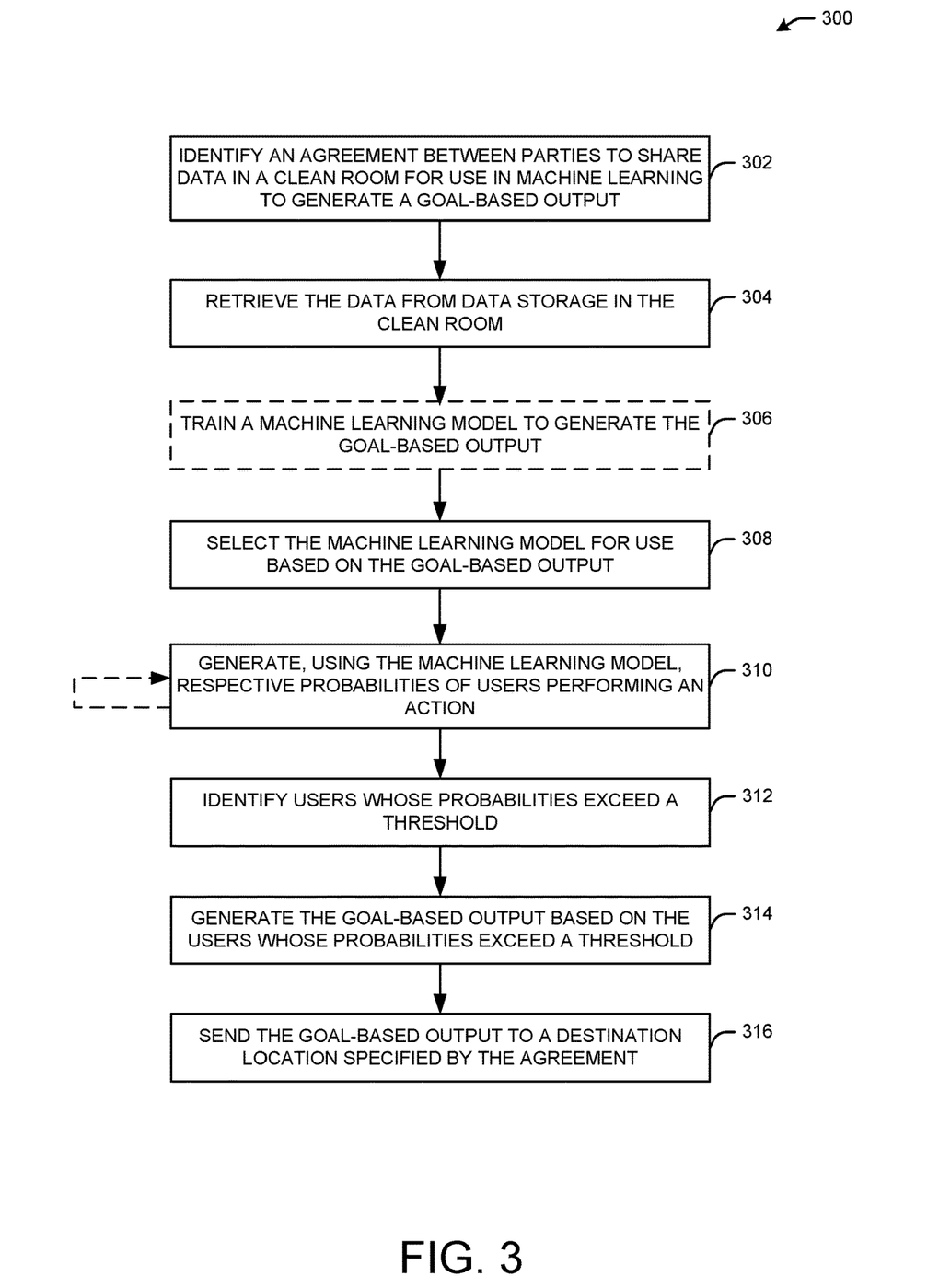
FIG. 3 illustrates a flow diagram of a process for clean-room based machine learning, in accordance with one or more example embodiments of the present disclosure.

FIG. 3 illustrates a flow diagram of a process 300 for clean-room based machine learning, in accordance with one or more example embodiments of the present disclosure.

At block 302, a device (or system, e.g., the clean room modules 419 of FIG. 4) may identify an agreement between parties to use a clean room (e.g., the clean room 102 of FIG. 1) to share data to be used in machine learning to generate a goal-based output specified by the agreement of the parties. The agreement may specify the output, along with configurations such as the type of data to be used, which party is to provide which data, one or more destination locations of the output of the ML encapsulated by the clean room, whether any of the parties is providing the ML model and/or training data (and the actual model, if being provided), privacy restrictions regarding who can access the data and the like. A default privacy restriction may be that none of the parties may access the data or the output within the clean room or may be provided the output from the clean room.

At block 304, the device may retrieve the data from data storage in the clean room. The parties and/or other third parties (e.g., the ad service platform data 124) may provide the data, such as advertiser data and advertisement conversion data in the context of advertising. When the goal-based outcome is not t with advertising, the data may be different, such as user preferences, content views, demographic data, and/or the like.

At block 306, the device optionally may train a machine learning model to generate the goal-based output. The training may apply to a model provided by the clean room or to a model provided by the parties to the clean room. Alternatively, the model may be pre-trained by one of the parties and provided to the clean room. When the goal-based output is a target audience for an ad campaign, for example, the training data may include product data as inputs to the reinforcement machine learning model to generate the target audience. The product data may include multiple product brands, and randomly generated negative samples of product brands.

At block 308, the device may, select the machine learning model (e.g., after it has been trained/generated) for use based on the goal-based output. Different ML models may be available for use to generate different outputs. When the goal-based output is a target audience for an ad campaign, the ML model selected may be one that has been trained to generate a target audience. When the goal-based output is something else, the ML model selected may be one that has been trained to generate that output.

At block 310, the device may use the machine learning model to generate respective outputs, such as the respective probabilities of users performing an action. The ML model may use multiple iterations, each time generating a set of probabilities, and then refining them through additional iterations (e.g., until the values do not exhibit further change, or converge to consistent respective values). The ML model may use reinforcement learning, for example, such as with a deep neural network or another architecture. The action may apply to an advertising context such as to purchase/not purchase a product, view/not view an advertisement, or the like, but is not limited to advertising.

At block 312, the device may identify users whose probabilities generated by the ML model exceed a threshold (e.g., a threshold likelihood of purchasing a product advertised by the campaign in that context). The most likely users to perform an action based on the goal, such as to purchase a product, may be selected for the goal-based output. At block 314, the device may generate the goal-based output. In the example of a target audience, the target audience may be limited to users having a respective probability of purchase (or whatever the goal may be) of the advertised product.

At block 316, the device may send the goal-based output to one or more destination locations specified by the multiple parties using the clean room based on their agreement. The destination location may exclude the multiple parties, ensuring privacy of the data in and produced within the clean room. Feedback regarding the goal-based output, such as performance feedback of a target audience regarding the performance of a campaign presented to the target audience, may be provided by the destination location and used to update the criteria of the model, resulting in the probabilities at block 310 changing. The egress destination location may be a party different than the party that provided the data used in the machine learning, for example, to protect the data in the clean room from being seen by the other party.

The descriptions herein are not meant to be limiting.

Figure 4:
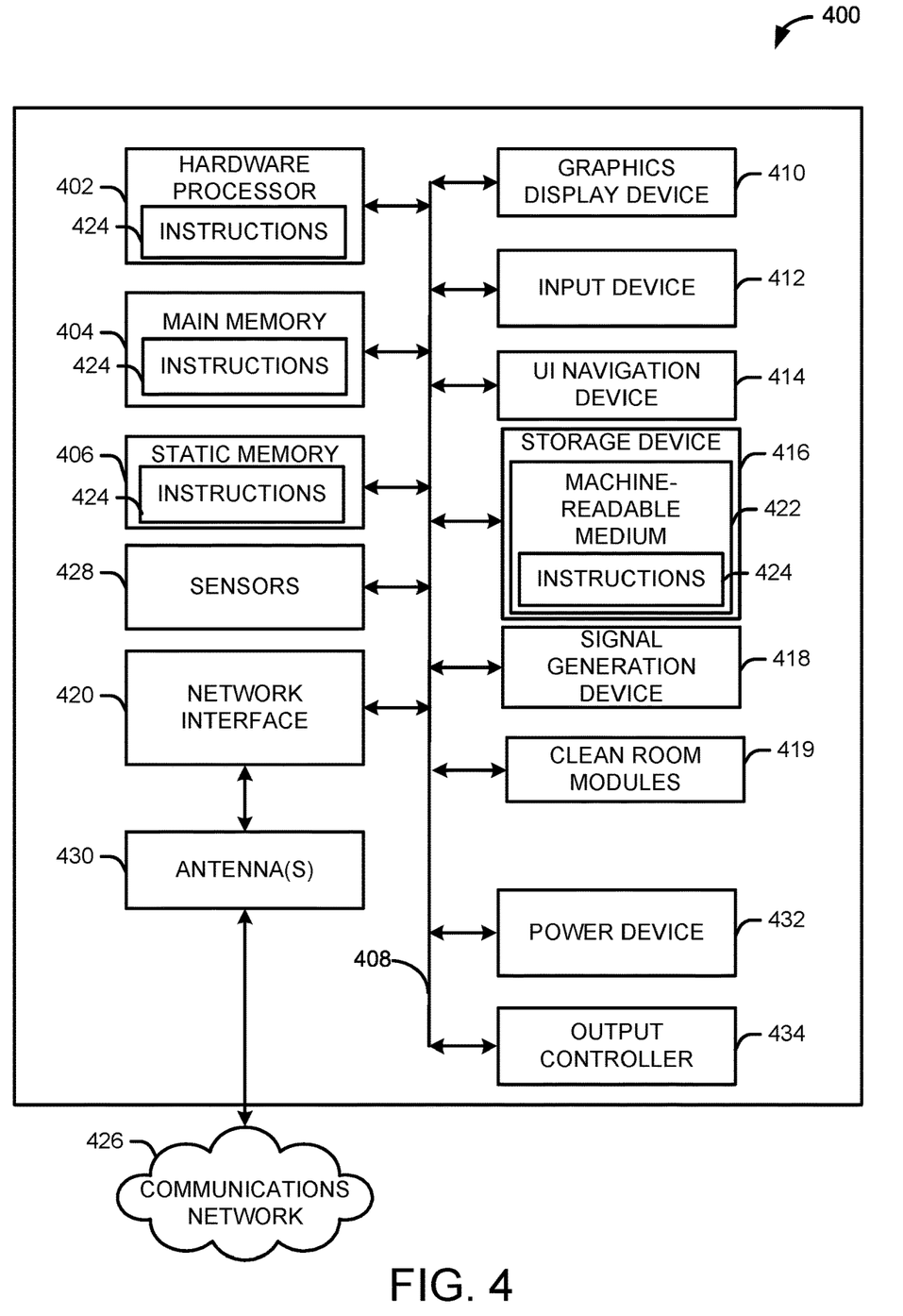
FIG. 4 illustrates a block diagram of an example machine upon which any of one or more techniques (e.g., methods) may be performed, in accordance with one or more example embodiments of the present disclosure.

FIG. 4 illustrates a block diagram of an example of a machine 400 (e.g., representing at least some of the components of FIG. 1 and FIG. 2) or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a tensor processing unit (TPU), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418, one or more clean room modules 419 (e.g., capable of the functionality of the components and steps of FIGS. 1-3), a network interface device/transceiver 420 coupled to antenna(s) 430, and one or more sensors 428, such as a microphone. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for encapsulating machine learning in a clean room to protect data used in the machine learning, the method comprising:

retrieving, by at least one processor operating within a clean room restricting access to inputs to and outputs of machine learning models encapsulated within the clean room, from data storage in the clean room, data shared between multiple parties for use in machine learning to generate a target audience, wherein the data comprise advertiser data and advertisement conversion data;

training, by the at least one processor, a reinforcement machine learning model, encapsulated within the clean room, based on product data as inputs to the reinforcement machine learning model to generate the target audience whose access is limited by the clean room;

selecting, by the at least one processor, the trained reinforcement machine learning model encapsulated within the clean room based on a goal provided by at least one of the multiple parties, wherein the goal is to generate the target audience;

generating, by the at least one processor, using the data as inputs to the selected reinforcement machine learning model in the clean room, a first set of probabilities encapsulated within the clean room, wherein each probability of the first set of probabilities is a first probability that a respective user may purchase a product of an online advertising campaign;

generating, by the at least one processor, using the selected reinforcement machine learning model in the clean room and the first set of probabilities, a second set of probabilities encapsulated within the clean room, wherein each probability of the second set of probabilities is a second probability that a respective user may purchase the product;

identifying, by the at least one processor, based on the second set of probabilities, a set of users having the second probability greater than a threshold probability, the set of users encapsulated within the clean room;

generating, by the at least one processor, in the clean room, the target audience, wherein the target audience is encapsulated within the clean room and consists of the set of users having the second probability greater than the threshold probability;

identifying, by the at least one processor, an egress location for the target audience, wherein the egress location is provided by at least one of the multiple parties; and sending, by the at least one processor, the target audience from the clean room to the egress location.

2. The method of claim 1, further comprising:
receiving feedback data indicative of performance of the online advertising campaign when presented to the target audience; and
adjusting criteria of the reinforcement machine learning model based on the feedback data.

3. The method of claim 1, wherein the egress location is a demand-side service advertising platform, wherein the multiple parties are not authorized to access the data with the clean room, and wherein the multiple parties are not authorized to receive the target audience.

4. The method of claim 1, further comprising:
receiving, from one of the multiple parties, the reinforcement machine learning model,
wherein training the reinforcement machine learning model is based on receiving the reinforcement machine learning model from the one of the multiple parties.

5. The method of claim 1, wherein the trained reinforcement learning model uses a collaborative filtering deep neural network architecture, wherein the product data comprise product brands and randomly generated negative samples of product brands not purchased, and wherein the inputs to the trained reinforcement learning model comprise user identifiers, user metadata, and product identifiers.

6. A method for encapsulating machine learning in a clean room to protect data used in the machine learning, the method comprising:
retrieving, by at least one processor operating within a clean room restricting access to inputs to and outputs of machine learning models encapsulated within the clean room, from data storage in the clean room, data shared between multiple parties for use in machine learning to generate a goal-based output;
training, by the at least one processor, a machine learning model of the machine learning models encapsulated within the clean room based on training data as inputs to the machine learning model to generate the goal-based output;

selecting, by the at least one processor, the machine learning model based on a goal provided by at least one of the multiple parties;
generating, by the at least one processor, using the data as inputs to the selected machine learning model in the clean room, a first set of probabilities encapsulated within the clean room, wherein each probability of the first set of probabilities is a first probability that a respective user may perform an action;
generating, by the at least one processor, using the selected machine learning model encapsulated within the clean room and the first set of probabilities, a second set of probabilities encapsulated within the clean room, wherein each probability of the second set of probabilities is a second probability that a respective user may perform the action;
generating, by the at least one processor, in the clean room, based on the second set of probabilities, the goal-based output, wherein the goal-based output is encapsulated within the clean room;
identifying, by the at least one processor, an egress location for the goal-based output, wherein at least one of the multiple parties provides the egress location; and
sending, by the at least one processor, the goal-based output from the clean room to the egress location.

7. The method of claim 6, further comprising:
receiving the training data from one of the multiple parties,
wherein the training is based on receiving the training data from the one of the multiple parties.

8. The method of claim 6, further comprising:
receiving, from one of the multiple parties, the machine learning model,
wherein training the machine learning model using the training data is based on receiving the machine learning model from the one of the multiple parties.

9. The method of claim 6, further comprising determining that a first party of the multiple parties is not authorized to access the data within the clean room and is authorized to receive the goal-based output, and that a second party of the multiple parties is not authorized to receive the goal-based output, and wherein the second party provides the data.

10. The method of claim 6, wherein the goal-based output is a target audience for an advertising campaign.

11. The method of claim 10, further comprising:
receiving feedback data indicative of performance of the advertising campaign when presented to the target audience; and
adjusting criteria of the machine learning model based on the feedback data.

12. The method of claim 10, wherein the data comprise advertiser data and advertisement conversion data, and wherein the machine learning model is trained based on product data as inputs to the machine learning model.

13. The method of claim 6, wherein each probability of the first set of probabilities is a first probability that a respective user may purchase a product of an advertising campaign, and wherein each probability of the second set of probabilities is a second probability that a respective user may purchase the product.

14. The method of claim 6, wherein the machine learning model is a reinforcement learning deep neural network.

15. A system for encapsulating machine learning in a clean room to protect data used in the machine learning, the system comprising at least one processor coupled to memory, the at least one processor operating in a clean room and configured to:

retrieve, from data storage in a clean room restricting access to inputs to and outputs of machine learning models encapsulated within the clean room, data shared between multiple parties for use in machine learning to generate a goal-based output;

train a machine learning model of the machine learning models based on training data as inputs to the machine learning model to generate the goal-based output;

select the machine learning model based on a goal indicated by at least one of the multiple parties;

generate, using the data as inputs to the selected machine learning model in the clean room, a first set of probabilities encapsulated within the clean room, wherein each probability of the first set of probabilities is a first probability that a respective user may perform an action;

generate, using the selected machine learning model encapsulated within the clean room and the first set of probabilities, a second set of probabilities encapsulated within the clean room, wherein each probability of the second set of probabilities is a second probability that a respective user may perform the action;

generate, based on the second set of probabilities, in the clean room, the goal-based output, wherein the goal-based output is encapsulated within the clean room;

identify an egress location for the goal-based output, wherein at least one of the multiple parties provides the egress location; and send the goal-based output from the clean room to the egress location.

16. The system of claim 15, wherein the at least one processor is further configured to determine that a first party of the multiple parties is not authorized to access the data within the clean room and is authorized to receive the goal-based output, and that a second party of the multiple parties is not authorized to receive the goal-based output, and wherein the second party provides the data.

17. The system of claim 15, wherein the goal-based output is a target audience for an advertising campaign, wherein the data comprise advertiser data and advertisement conversion data, and wherein the machine learning model is trained based on product data as inputs to the machine learning model.

18. The system of claim 15, wherein the at least one processor is further configured to:

receive feedback data indicative of performance of an advertising campaign when presented to a target audience; and adjust criteria of the machine learning model based on the feedback data.

\* \* \* \* \*